US012785251B2

(12) United States Patent
Wang

(10) Patent No.: US 12,785,251 B2
(45) Date of Patent: Nov. 3, 2026

(54) BLUETOOTH ACCESSORY WITH INSULATION MOUNT

(71) Applicant: Beiing Xin You Ling Xi Technology Co., Ltd., Beijing (CN)

(72) Inventor: Jieming Wang, Beijing (CN)

(73) Assignee: Beiing Xin You Ling Xi Technology Co., Ltd., Beijing (CN)

( * ) Notice: Subject to any disclaimer, the term of this patent is extended or adjusted under 35 U.S.C. 154(b) by 447 days.

(21) Appl. No.: 18/473,170

(22) Filed: Sep. 22, 2023

(65) Prior Publication Data

US 2024/0222846 A1 Jul. 4, 2024

(30) Foreign Application Priority Data

Dec. 28, 2022 (CN) ......................... 202223532885.9
Dec. 28, 2022 (CN) ......................... 202223532958.4

(51) Int. Cl.

| | |
|---|---|
| ***H01Q 1/22*** | (2006.01) |
| ***G06F 3/041*** | (2006.01) |
| ***H01Q 7/00*** | (2006.01) |
| ***H02J 7/70*** | (2026.01) |

(52) U.S. Cl.

CPC ....... *H01Q 1/2291* (2013.01); *G06F 3/04164* (2019.05); *H01Q 7/00* (2013.01); *H02J 7/70* (2026.01)

(58) Field of Classification Search

CPC ....... H02J 7/0042; H01Q 7/00; H01Q 1/2291; G06F 3/04164; G06F 1/163; G06F 1/1656; G06F 1/1698

See application file for complete search history.

(56) References Cited

U.S. PATENT DOCUMENTS 7,623,077 B2 * 11/2009 Wang ....................... H01Q 1/22 343/702
2020/0337162 A1 * 10/2020 Perkins .................. G04G 17/04

FOREIGN PATENT DOCUMENTS

| | | |
|---|---|---|
| CN | 104881948 A | 9/2015 |
| CN | 110381482 A | 10/2019 |
| CN | 219124351 U | 6/2023 |

* cited by examiner

*Primary Examiner* — Allen L Parker
*Assistant Examiner* — Dakota M Talbert
(74) *Attorney, Agent, or Firm* — Nitin Kaushik

(57) ABSTRACT

The present application relates to the technical field of intelligent accessories, and in particular to a Bluetooth accessory. The Bluetooth accessory comprises a housing provided with an accommodating cavity, and a cavity is formed on one side of the housing connected to the accommodating cavity; an insulating panel arranged at the cavity port; an insulating mounting seat arranged in the accommodating cavity, a first mounting area is arranged on one side of the insulating mounting seat facing the insulating panel, and the first mounting area is arranged at an orthogonal projection position of the insulating mounting seat corresponding to the insulating panel; a Bluetooth antenna arranged on the insulating mounting seat and located in the first mounting area; a control module arranged on the insulating mounting seat and electrically connected to the Bluetooth antenna.

13 Claims, 7 Drawing Sheets

BLUETOOTH ACCESSORY WITH INSULATION MOUNT

CROSS-REFERENCE TO RELATED APPLICATIONS

The application claims priority to Chinese patent application No. 2022235328859, filed on Dec. 28, 2022 and No. 2022235329584, filed on Dec. 28, 2022, the entire contents of which are incorporated herein by reference.

TECHNICAL FIELD

The present application relates to the technical field of intelligent accessories, and in particular to a Bluetooth accessory.

BACKGROUND

A Bluetooth accessory refers to a wearable device that has the appearance and functionality of accessories and is integrated with an intelligent hardware module, an induction switch module, a Bluetooth communication module, and other modules. The Bluetooth accessory may communicate with intelligent terminals such as mobile phones and tablet computers through Bluetooth communication modules.

During the use of the product, the user may send control instructions to the intelligent terminal by interacting with the Bluetooth accessory, and the Bluetooth accessory may also receive the control instructions sent by the intelligent terminal and feed back to the user accordingly.

However, the Bluetooth accessory in the related technology has the defects of unstable Bluetooth communication and poor reliability.

SUMMARY

In view of this, a Bluetooth accessory is provided according to the present application, which solves the problems of unstable Bluetooth communication and poor reliability.

A Bluetooth accessory, including:

- a housing provided with an accommodating cavity, and a cavity port is formed on one side of the housing connected to the accommodating cavity;
- an insulating panel arranged at the cavity port;
- an insulating mounting seat arranged in the accommodating cavity, a first mounting area is arranged on one side of the insulating mounting seat facing the insulating panel, and the first mounting area is arranged at an orthogonal projection position of the insulating mounting seat corresponding to the insulating panel;
- a Bluetooth antenna arranged on the insulating mounting seat and located in the first mounting area;
- a control module arranged on the insulating mounting seat and electrically connected to the Bluetooth antenna.

In one embodiment, the first mounting area and the Bluetooth antenna are both arranged in a ring shape along a circumferential direction of the insulating mounting seat.

In one embodiment, an accommodating groove is defined in the first mounting area, and the Bluetooth antenna is accommodated in the accommodating groove.

In one embodiment, a second mounting area is arranged on one side of the insulating mounting seat away from the first mounting area, the control module is arranged in the second mounting area.

In one embodiment, the Bluetooth accessory further includes mounting screws. A first connecting hole is defined on the accommodating groove, the Bluetooth antenna is provided with a fixing ring, and the first connecting hole is connected with an inside of the fixing ring; one end of the mounting screw passes through the inside of the fixing ring and the first connecting hole, and is screwed to the control module.

In one embodiment, a coaming is arranged on one side of the insulating mounting seat far from the first mounting area, the coaming is distributed around a circumference of the insulating mounting seat to define a second mounting area, the control module is limited in the coaming.

In one embodiment, multiple buckles are arranged on one side of the coaming far away from the insulating mounting seat, the buckles are spaced apart around the second mounting area, and all buckles are clamped with the control module.

In one embodiment, the Bluetooth accessory further includes fixing screws, the fixing screws and the buckles are spaced apart around the second mounting area, a fixing hole is defined on the insulating mounting seat, and a fixing screw penetrates through the fixing hole and is screwed to the control module.

In one embodiment, the Bluetooth accessory further includes a touch sensing module electrically connected with the control module;

- a third mounting area is arranged on one side of the insulating mounting seat facing the insulating panel, the second mounting area is distributed around the third mounting area, and the touch sensing module is arranged in the third mounting area.

In one embodiment, a mounting bump is arranged on one side of the insulating mounting seat facing the insulating panel, a third mounting area is formed by extending one end of the mounting bump towards a direction close to the insulating panel.

In one embodiment, the control module is provided with a connecting terminal, a second connecting hole is defined on the insulating panel, and the second connecting hole penetrates through the mounting bump; one end of the connecting terminal penetrates through the second connecting hole and is connected to the touch sensing module.

In one embodiment, the Bluetooth accessory further includes a charging assembly, the charging assembly is electrically connected to the control module;

- the housing is provided with a charging port which penetrates through the housing, and the charging port is arranged corresponding to the charging assembly; the charging assembly is arranged in the accommodating cavity and exposed out of the housing through the charging port.

In one embodiment, the charging assembly includes a first conductive part and a second conductive part, the first conductive part and the second conductive part are both electrically connected to the control module, the first conductive part is exposed at the charging port, and the second conductive part is arranged outside the housing.

In one embodiment, the first conductive part includes an insulating mounting plate and an electrode block, the insulating mounting plate is arranged at the charging port, and the electrode block penetrates through the insulating mounting plate and is exposed at the charging port.

In one embodiment, the housing includes a first housing and a second housing, an insulating panel is arranged on the first housing, and a charging port is arranged on the second housing. The second housing is made of metal material to form a second conductive part on the outer side of the second housing.

In one embodiment, the first housing is detachably connected with the second housing.

In the Bluetooth accessory provided by the embodiment of the application, the insulating panel is made of an insulating material, and compared with a metal material, the insulating panel has less influence on shielding Bluetooth signals, by providing the insulating panel corresponding to the Bluetooth antenna, the impact of the housing structure on Bluetooth signal transmission may be reduced, making it easier for Bluetooth signals to radiate into the accommodating cavity or out of the external space of the housing; this arrangement ensures the aesthetic appearance of the Bluetooth accessory, and the Bluetooth signal transmission and reception is more stable, and the reliability of Bluetooth communication is improved.

REFERENCE NUMERALS IN THE DRAWINGS

Figure 1:
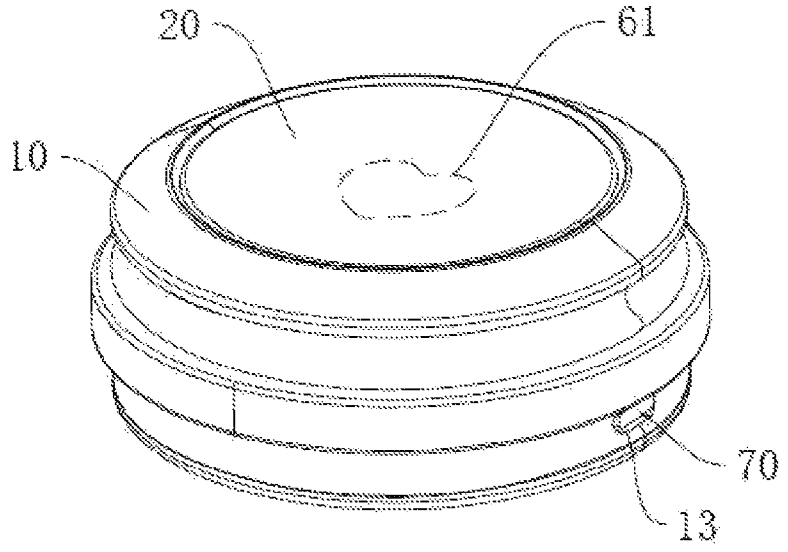
FIG. 1 is a schematic structural diagram of a Bluetooth accessory in a first embodiment of the present application.

10. housing; 11. accommodation cavity; 12. cavity port; 13. charging port; 20. insulating panel; 30. insulating mounting seat; 31. first mounting area; 311. accommodating groove; 312. first connecting hole; 32. second mounting area; 33. mounting screws; 34. coaming; 341. buckle; 35. fixing screws; 36. fixing hole; 37. third mounting area; 38. mounting bump; 381. second connecting hole; 40. Bluetooth antenna; 41. fixing ring; 50. control module; 51. control circuit board; 511. connecting pipe; 512. connecting terminals; 60. touch sensing module; 61. inductive element; 70. charging assembly; 71. first conductive part; 711. insulating mounting plate; 7111. electrode hole; 712. electrode block; 713, conductive copper ring; 714. anode circuit board; 72. second conductive part; 80. first housing; 90. second housing.

DETAILED DESCRIPTION OF THE EMBODIMENTS

In the description of the embodiment of the application, the technical terms "first" and "second" are only used to distinguish different objects, and cannot be understood as indicating or implying relative importance or implicitly indicating the number, specific order or primary-secondary relationship of the indicated technical features. In the description of the embodiment of the present application, the meaning of "multiple" is more than two, unless otherwise specifically defined.

It should be noted that when a component is considered to be "connected" to another component, it may be directly connected to another component or there may be components with a centering setting at the same time. When an element is considered to be "disposed" on another element, it can be directly disposed on another element or there may be elements in the middle. In this application, unless otherwise specified and limited, the terms "installation", "linkage", "connection" and "fixation" should be broadly understood. For example, it may be a fixed connection, a detachable connection, or an integral connection; it may be a mechanical connection or an electrical connection; it may be directly connected, or indirectly connected through an intermediate medium, or it may be the internal connection between two components. For ordinary technical personnel in this field, the specific meanings of the above terms in this application can be understood based on specific circumstances.

Unless otherwise defined, all technical and scientific terms used herein have the same meaning as commonly understood by those skilled in the technical field of this application. The terminology used herein in the specification of this application is only for the purpose of describing specific embodiment, and is not intended to limit this application. The terms "including" and "having" in the description and claims of this application, as well as the accompanying drawings, and any variations thereof, are intended to cover non exclusive inclusion.

The reference to "embodiment" in this article means that specific features, structures, or characteristics described in conjunction with the embodiment can be included in at least one embodiment of the present application. The phrase appearing in various positions in the specification does not necessarily refer to the same embodiment, nor is it an independent or alternative embodiment that is mutually exclusive with other embodiment. It is understood explicitly and implicitly by those skilled in the art that the embodiment described herein can be combined with other embodiment.

A Bluetooth accessory is provided according to the embodiment of the present application, which may be applied to wearable devices such as bracelets, pendants or buttons. Bluetooth accessories have Bluetooth function, and may communicate wirelessly with intelligent terminals such as mobile phones and tablet computers through Bluetooth function.

Figure 2:
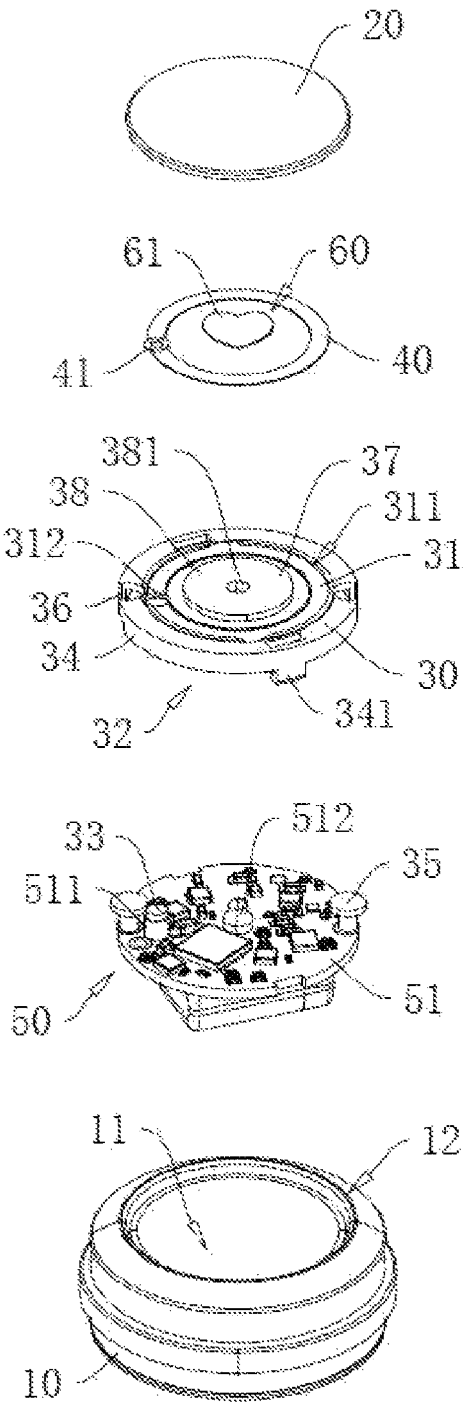
FIG. 2 is an exploded schematic view of the Bluetooth accessory in the first embodiment of the present application.

Referring to FIG. 1 and FIG. 2, the Bluetooth accessory includes a housing 10, an insulating panel 20, an insulating mounting seat 30, a Bluetooth antenna 40 and a control module 50. The housing 10 is provided with an accommodating cavity 11, and a cavity is formed on one side of the housing 10 connected to the accommodating cavity 11. The insulating panel 20 is arranged at the cavity port 12 and fixedly connected to the housing 10, and blocks the accommodating cavity 11.

The insulating panel 20, the insulating mounting seat 30, the Bluetooth antenna 40 and the control module 50 are all located in the accommodating cavity 11.

The Bluetooth antenna 40 and the control module 50 are respectively fixedly connected to the insulating mounting seat 30, and the insulating mounting seat 30 is fixedly connected to the housing 10. The Bluetooth antenna 40 is electrically connected with the control module 50, and has the function of transmitting and receiving electromagnetic waves. The control module 50 communicates wirelessly with the intelligent terminal through the Bluetooth antenna 40.

The insulating panel 20, the insulating mounting seat 30 and the control module 50 are sequentially arranged along a depth direction of the housing 10. A first mounting area 31 is provided at one side of the insulating mounting seat 30 facing the insulating panel 20, and the insulating panel 20 has a projection on the insulating mounting seat 30 along the depth direction of the housing 10. The first mounting area 31 is arranged corresponding to the projection, that is, the first mounting area 31 overlaps with the projection. The first mounting area 31 is adapted to the Bluetooth antenna 40, which is located in the first mounting area 31 and fixedly connected to the insulating mounting seat. In this way, the insulating panel 20 is arranged corresponding to the position of the Bluetooth antenna 40, and the insulating panel 20 is located in the signal transceiving direction of the Bluetooth antenna 40. It can be understood that the projection of the insulating panel 20 along the depth direction of the housing 10 is an orthographic projection, that is, in the depth direction of the housing 10, the insulating panel 20 corresponds to the first mounting area 31, in case that the Bluetooth antenna 40 is disposed in the first mounting area 31, the insulating panel 20 completely covers an upper space of the Bluetooth antenna 40.

In traditional Bluetooth accessory design, in order to ensure the aesthetic appearance of the accessory, an outer shell of the accessory is mostly made of metal materials, but the metal shell may block the signal reception of the Bluetooth antenna inside. However, in the conventional technology, in order to solve this problem, the Bluetooth antenna is mostly arranged at the top of the accessory, and a larger Bluetooth antenna is adopted to achieve better communication effect. However, in this way, in order to ensure the Bluetooth communication effect, the overall volume of the accessory made is relatively large, which greatly affects the aesthetics and portability of the accessory, and cannot meet the diverse needs of users for the accessory.

In this embodiment, the insulating panel 20 is made of insulating material, which has less influence on the shielding of Bluetooth signals compared with metal materials. The insulating panel 20 is arranged corresponding to the Bluetooth antenna 40, which may reduce the influence of the housing structure on the transmission of Bluetooth signals and make the Bluetooth signals radiate into the accommodating cavity 11 or out of the external space of the housing 10 more easily, which makes the sending and receiving of Bluetooth signals more stable and improves the reliability of Bluetooth communication.

In an implementation of this embodiment, the insulating panel 20 is connected to an inner wall of the cavity port 12, and the fixed connection methods include but are not limited to bonding and clamping. A stepped part is further provided on the inner wall of the cavity port 12, the insulating panel 20 is positioned and matched with the stepped part to improve the installation stability of the insulating panel 20.

In an implementation of this embodiment, both the first mounting area 31 and the Bluetooth antenna 40 are annularly arranged along a circumferential direction of the insulating mounting seat 30, so as to distribute Bluetooth antenna 40 around the insulating mounting seat 30, increase a radiation range of Bluetooth antenna 40, and further improve Bluetooth communication stability.

Specifically, the insulating panel 20 is overall circular, and the insulating mounting seat 30 is also overall circular, the Bluetooth antenna 40 is annularly arranged around the insulating mounting seat 30, and a radius of the insulating panel 20 is larger than an outer diameter of the Bluetooth antenna 40.

In an implementation of this embodiment, the first mounting area 31 is provided with an accommodating groove 311, and the accommodating groove 311 is recessed on the surface of the insulating mounting seat 30 in a direction away from the insulating panel 20. The Bluetooth antenna 40 is accommodated in the accommodating groove 311 and fixed on the insulating mounting seat 30. On one hand, the accommodating groove 311 provides storage space for Bluetooth antenna 40, and on the other hand, it limits the position of Bluetooth antenna 40, facilitating the installation and fixation of Bluetooth antenna 40.

In an implementation of this embodiment, a second mounting area 32 is provided at one side of the insulating mounting seat 30 facing away from the first mounting area 31, the control module 50 is disposed in the second mounting area 32. The Bluetooth antenna 40 and control module 50 are fixed on both sides of the insulating mounting seat 30, making the installation structure more concise and achieving higher space utilization.

Specifically, the insulating mounting seat 30 is provided with mounting screws 33, a first connecting hole 312 is defined on a bottom wall of the accommodating groove 311 for mounting screws 33 to penetrate. The first connecting hole 312 passes through the insulating mounting seat 30. The Bluetooth antenna 40 has a notch, and a fixing ring 41 is fixedly connected to the notch, and the fixing ring 41 is communicated with the first connecting hole 312. The mounting screw 33 passes through the fixing ring 41 and the first connecting hole 312 and is screwed to the control module 50.

It can be understood that the Bluetooth antenna 40 is fixedly connected to the insulating mounting seat 30 through the mounting screw 33, making product installation convenient and fast, improving production efficiency. Meanwhile, the Bluetooth antenna 40 is fixedly connected to the control module 50 through the mounting screws 33, thereby simplifying the fixed connection structure and improving the space utilization rate. Further, the volume of the Bluetooth accessory of the present application is not limited due to the arrangement of the Bluetooth antenna, so that the overall volume of the Bluetooth accessory is reduced, and the purpose of making the Bluetooth accessory smaller and more exquisite may be achieved, so as to meet the requirements of users for the exquisiteness of the accessory.

In an implementation of this embodiment, the Bluetooth antenna 40 is adhered to the bottom wall of the accommodating groove 311. During the product assembly process, the Bluetooth antenna 40 may be bonded to the insulating mounting seat 30 in advance, and then the insulating mounting seat 30 and the control module 50 are fixed, making installation more convenient and improving production efficiency.

Specifically, a groove wall of the accommodating groove 311 is provided with a concave position for the fixing ring 41 to accommodate, the concave position has a positioning function for the fixing ring 41, thereby limiting the circumferential rotation between the Bluetooth antenna 40 and the insulating mounting seat 30 and improving the mounting stability.

In an implementation of this embodiment, the fixing ring 41 and the mounting screw 33 are both made of conductive material, and the control module 50 is welded with a connecting pipe 511, an inner wall of the connecting pipe 511 is provided with a threaded surface, which is made of conductive material. The connecting pipe 511 penetrates the first connecting hole 312 and the fixing ring 41, and the mounting screw 33 is screwed to the connecting pipe 511. Meanwhile, the mounting screw 33 contacts the connecting pipe 511 to realize electrical connection, so that the Bluetooth antenna 40 is electrically connected with the control module 50.

Figure 3:
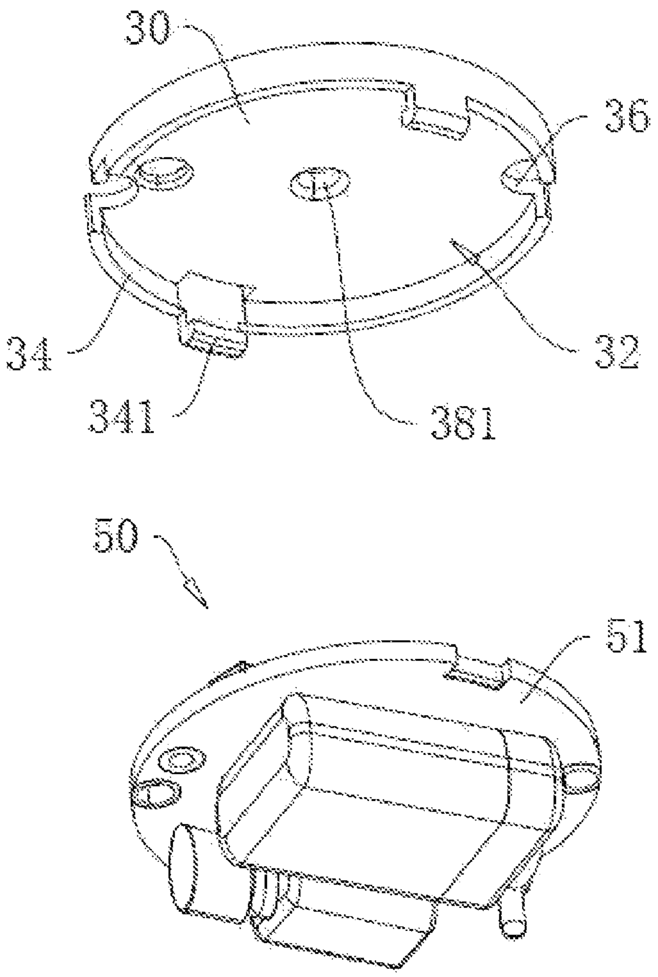
FIG. 3 is an exploded schematic view of an insulating mounting seat and a control module in the first embodiment of the present application.

Referring to FIG. 2 and FIG. 3, in an implementation of this embodiment, a coaming 34 is arranged on a side of the insulating mounting seat 30 far from the first mounting area 31, the coaming 34 is distributed around the circumference of the insulating mounting seat 30 to define the second mounting area 32. A shape of the coaming 34 is matched with an outer edge of the control module 50, and the control module 50 is accommodated in the coaming 34. Moreover, the coaming 34 limits the control module 50 to improve the connection stability between the control module 50 and the insulating mounting seat 30.

Specifically, multiple buckles 341 are mounted on a side of the coaming 34 away from the insulating mounting seat 30, the buckles 341 are spaced around the second mounting area 32. One end of the buckle 341 is fixedly connected to the coaming 34, and the other end of the buckle 341 is provided with a hook. In case that the control module 50 is accommodated in the second mounting area 32, multiple buckles 341 are engaged with the control module 50 through various hooks, so that the control module 50 is fixedly connected to the insulating mounting seat 30.

It can be understood that the insulating mounting seat 30 is fixedly connected to the control module 50 through the buckle 341, making product installation convenient and fast, and the control module 50 may be detachably connected to the insulating mounting seat 30 to facilitate the later removal, maintenance, or replacement of the control module 50.

Further, the insulating mounting seat 30 is provided with a fixing screw 35, the fixing screw 35 and multiple buckles 341 are spaced around the second mounting area 32. Fixing holes 36 are defined on the insulating mounting seat 30, which pass through the insulating mounting seat 30 and correspond to the fixing screws 35 one by one. The fixing screw 35 passes through the fixing hole 36 and is screwed to the control module 50. The fixing screws 35 reinforce the connection between the control module 50 and the insulating mounting seat 30, thus improving the connection stability.

In this embodiment, the number of fixing screws 35 is the same as the number of buckles 341, which are both 2. Each fixing screw 35 and each buckle 341 are staggered to improve the stability between the connecting points of the control module 50 and the insulating mounting seat 30.

In an implementation of this embodiment, the insulating mounting seat 30, the coaming 34 and the buckle 341 are integrally formed to improve the production efficiency.

In an implementation of this embodiment, the Bluetooth accessory further includes a touch sensing module 60, which is electrically connected to the control module 50. The touch sensing module 60 is disposed on one side of the insulating mounting seat 30 facing the insulating panel 20. The touch sensing module 60 is used to detect the user's touch on the designated position on the insulating panel 20, and generate an interactive signal to send to the control module 50. The control module 50 executes the specified task in response to the received interactive signal.

Specifically, a third mounting area 37 is provided on the side of the insulating mounting seat 30 facing the insulating panel 20, the second mounting area 32 is distributed around the third mounting area 37, that is, the third mounting area 37 is located in the middle of the second mounting area 32, the touch sensing module 60 is fixedly mounted in the third mounting area 37. A sensing area is formed in the middle of the insulating panel 20, and the sensing area is arranged corresponding to the touch sensing module 60. The touch sensing module 60 may detect the user's touch on the sensing area and generate an interactive signal to send to the control module 50.

In an implementation of this embodiment, a mounting bump 38 is provided on the side of the insulating mounting seat 30 facing the insulating panel 20, a third mounting area 37 is formed on one end face of the mounting bump 38 facing the insulating panel 20, the touch sensing module 60 is fixedly connected to the mounting bump 38. One end of the mounting bump 38 extends in a direction close to the insulating panel 20 to reduce the distance between the touch sensing module 60 and the insulating panel 20, and to improve the sensing sensitivity of the touch sensing module 60.

In an implementation of this embodiment, a second connecting hole 381 is defined on the insulating mounting seat 30, the second connecting hole 381 penetrates the mounting bump 38. A connecting terminal 512 is provided on the control module 50, one end of the connecting terminal 512 is welded to the control module 50, and the other end of the connecting terminal 512 passes through the second connecting hole 381 and abuts against the touch sensing module 60, so that the touch sensing module 60 is electrically connected with the control module 50.

During the product assembly process, the touch sensing module 60 may be fixed to the mounting bump 38, and then the control module 50 with the connecting terminal 512 may be fixed to the insulating mounting seat 30, so that one end of the connecting terminal 512 passes through the second connecting hole 381 and abuts against the touch sensing module 60, which is convenient and quick to assemble.

Specifically, the connecting terminal 512 is an elastic probe, in case that the connecting terminal 512 abuts against the touch sensing module 60, the connecting terminal 512 elastically contracts to improve the connection stability with the touch sensing module 60.

In an implementation of this embodiment, the touch sensing module 60 includes an inductive element 61, an induction circuit board and a conductive copper foil. The induction circuit board includes, but is not limited to, flexible printed circuit board, which is fixed to the third mounting area 37 by bonding, and the inductive element 61 and the conductive copper foil are electrically connected through the induction circuit board. The inductive element 61 is located on the side of the induction circuit board facing the insulating panel 20, which is used to detect the touch action of the user on the insulating panel 20, and includes but not limited to induction coils, sheet-like induction elements, etc. The conductive copper foil is located on the side of the induction circuit board facing the mounting bump 38, and the connecting terminal 512 abuts against the conductive copper foil.

Referring to FIG. 1 and FIG. 2, specifically, the inductive element 61 is a sheet-like inductive element, and is arranged in a specific shape such as a heart shape. The inductive area of the insulating panel 20 is transparent, so that the inductive element 61 may be exposed on the insulating panel 20, the user may observe the position of the inductive area by observing the inductive element 61, so as to guide the user to touch the inductive area and facilitate the user's use.

In an implementation of this embodiment, the control module 50 includes a control circuit board 51 and a control block. The control circuit board 51 is fixed to the insulating mounting seat 30, that is, the connecting pipe 511 is arranged on the control circuit board 51, and the control circuit board 51 is screwed with the fixing screw 35.

The control module is arranged and electrically connected to the control circuit board 51, and both the Bluetooth antenna 40 and the touch sensing module 60 are electrically connected to the control circuit board 51. The control module includes but is not limited to a microprocessor. The control module is used for receiving electrical signals from electronic components such as the Bluetooth antenna 40 and the touch sensing module 60, or the control module generates control signals to electronic components such as the Bluetooth antenna 40 and the touch sensing module 60, so as to realize various functions of the Bluetooth accessory.

The Bluetooth accessory further includes a feedback module which is arranged and electrically connected to the control circuit board 51. The feedback module is used to make feedback actions in response to the control signal of the control module to convey information to users. The feedback module includes, but is not limited to, vibration motors, speakers, light-emitting elements, etc.

The Bluetooth accessory further includes a power module, which is arranged and electrically connected to the control circuit board 51. The power module has charging and discharging functions, and may supply its stored electrical energy to other functional modules such as control module, touch sensing module 60, and feedback module.

The Bluetooth accessory further includes a charging assembly 70, the charging assembly 70 is disposed in the housing 10 and electrically connected to the control circuit board 51. The charging assembly 70 is used to connect with an external power supply to charge the power module.

In this embodiment, the charging assembly 70 includes a charging interface, including but not limited to a USB interface, a Type-C interface, and the like. A charging port 13 is arranged on the side of the housing 10 far away from the insulating panel 20, the charging port 13 is arranged corresponding to the charging assembly 70, and penetrates through the housing 10 to communicate with the accommodation cavity 11. The charging interface is arranged at the charging port 13 and exposed to the housing 10 through the charging port 13 for plug-in connection of external power supply.

It may be understood that the above-mentioned control module, feedback module, power module, charging assembly 70, etc. are only examples of functional modules. In actual products, other functional modules may be configured according to the actual functions of the Bluetooth accessory, and this application does not limit this.

The following is an application scenario of a Bluetooth accessory provided by this embodiment. The first user holds a first Bluetooth accessory and a first intelligent terminal, and the first Bluetooth accessory communicates with the first intelligent terminal via Bluetooth. The second user holds a second Bluetooth accessory and a second intelligent terminal, and the second Bluetooth accessory communicates with the second intelligent terminal via Bluetooth.

In case that the first user touches the inductive area of the first Bluetooth accessory, the first Bluetooth accessory detects the touch action of the first user and sends interactive instructions to the first intelligent terminal through Bluetooth wireless communication. The first intelligent terminal receives interactive instructions and sends call instructions to the second intelligent terminal through the wireless network. The second intelligent terminal receives call instructions and sends interactive instructions to the second Bluetooth accessory. The second Bluetooth accessory responds to receiving interactive instructions and makes feedback actions to call the second user, achieving remote interaction between the first and second users.

Figure 4:
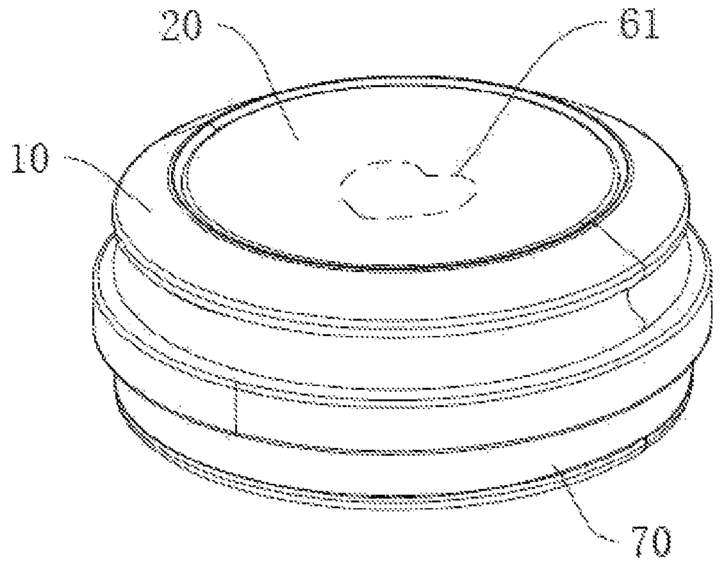
FIG. 4 is a structural schematic diagram of the Bluetooth accessory in a second embodiment of the present application.
Figure 5:
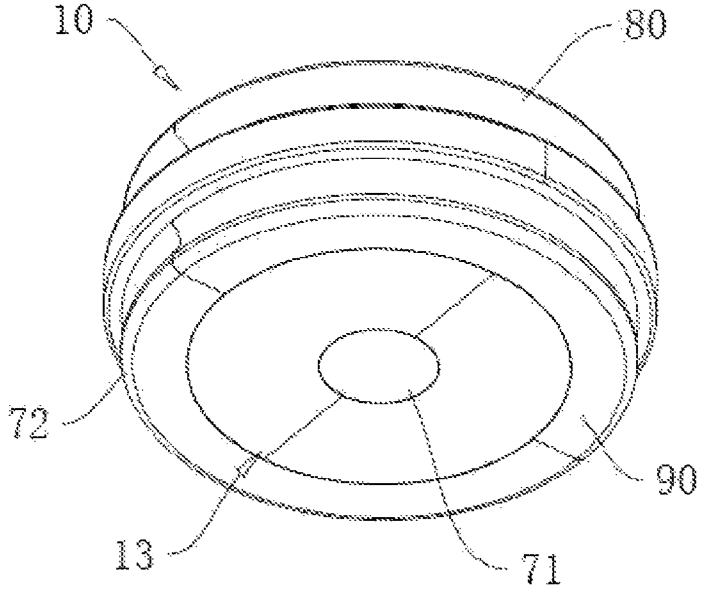
FIG. 5 is a structural schematic diagram of the Bluetooth accessory from another perspective in the second embodiment of the present application.

Referring to FIG. 4 and FIG. 5, in another embodiment of the present application, the charging assembly 70 includes a first conductive part 71 and a second conductive part 72. Both the first conductive part 71 and the second conductive part 72 are electrically connected to the control circuit board 51. The first conductive part 71 is exposed from the charging port 13, and the second conductive part 72 is arranged outside the housing 10.

It may be understood that the first conductive part 71 and the second conductive part 72 form a positive and negative electrode structure, which may charge the power module by contacting an external power source. For convenience of description, the first conductive part 71 is used as the positive terminal to connect the positive electrode of the power module. The second conductive part 72 is used as the negative terminal to connect to the negative electrode of the power module.

In case of charging Bluetooth accessories, the anode and cathode of the external power supply may be contacted with the first conductive part 71 and the second conductive part 72 respectively, so as to form a charging loop between the external power supply and the power supply module and realize rapid charging. In this embodiment, the plug-in structure is replaced by the conductive structure on the outer side of the housing 10, so that the step of plug-in connection during charging is omitted, and charging is more convenient.

Figure 6:
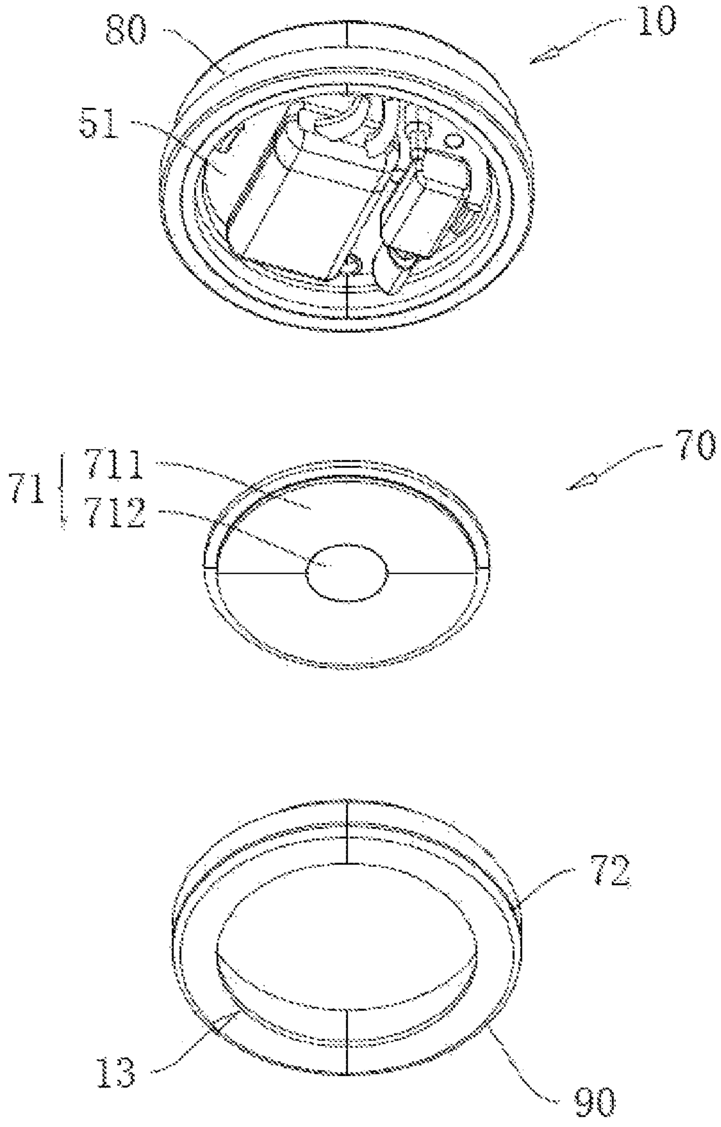
FIG. 6 is an exploded schematic view of the Bluetooth accessory in the second embodiment of the present application.
Figure 7:
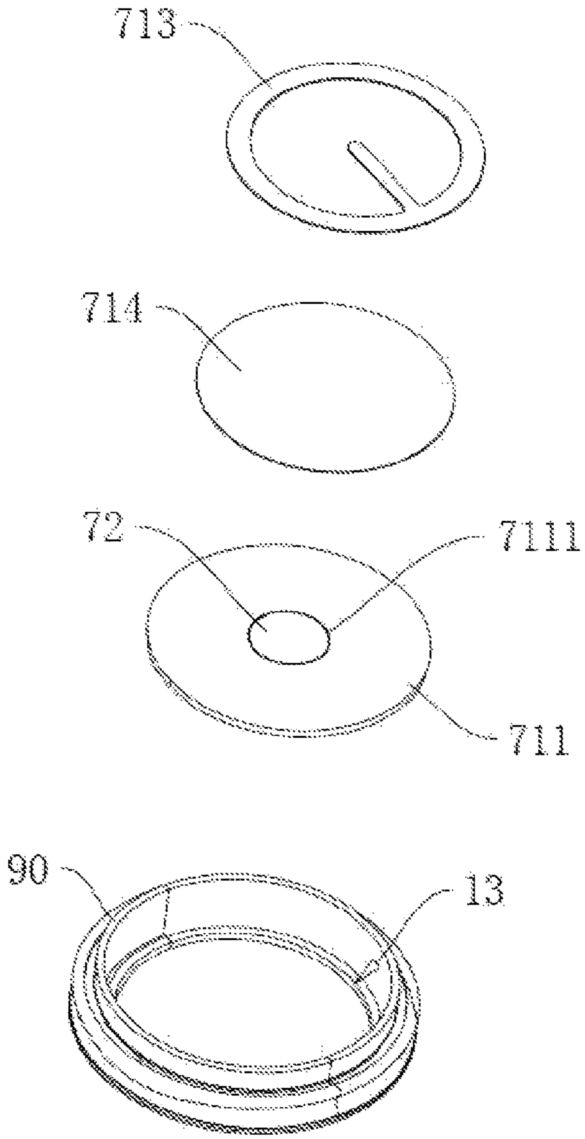
FIG. 7 is an exploded schematic view of a second housing and a first conductive part in the second embodiment of the present application.

Referring to FIG. 6 and FIG. 7, in an implementation of this embodiment, the first conductive part 71 includes an insulating mounting plate 711 and an electrode block 712, the insulating mounting plate 711 is arranged at the charging port 13, and the electrode block 712 penetrates through the insulating mounting plate 711 and is exposed at the charging port 13.

Specifically, the first conductive part 71 further includes an anode circuit board 714 and a conductive copper ring 713. The anode circuit board 714 is fixedly connected to the insulating mounting plate 711, and the anode circuit board 714 may be a flexible printed circuit board and is fixed to the insulating mounting plate 711 by bonding. The electrode block 712 and the conductive copper ring 713 are respectively arranged on both sides of the anode circuit board 714, the conductive copper ring 713 includes a first part and a second part, where the first part is arranged in a ring shape and distributed around the insulating mounting plate 711. The second part points towards the center of the circle from an outer edge of the first part, with one end of the first part electrically connected to the second part and the other end of the first part electrically connected to the electrode block 712.

In an implementation of this embodiment, a shape of the insulating mounting plate 711 is adapted to the charging port 13, and the insulating mounting plate 711 blocks the charging port 13. An electrode hole 7111 is defined on the insulating mounting plate 711, the electrode hole 7111 passes through the insulating mounting plate 711, and the electrode block 712 passes through the electrode hole 7111 to be exposed from the charging port 13.

Specifically, the electrode block 712 is hermetically connected with the electrode hole 7111, the insulating mounting plate 711 is hermetically connected with the charging port 13 to reduce the interference of environmental factors, such as water and dust, on the internal structure of the accommodating cavity 11.

In an implementation of this embodiment, the housing 10 includes a first housing 80 and a second housing 90, and the first housing 80 is detachably connected with the second housing 90. The detachable connection methods include but are not limited to threaded connection, bolted connection, clamp connection, etc.

The first housing 80 and the second housing 90 are both hollow structures, and an internal space of the first housing 80 is combined with an internal space of the second housing 90 to form an accommodating cavity 11. The first housing 80 is made of insulating material, and the first housing 80 is provided with a cavity port 12, and the insulating panel 20 is fixed to the first housing 80. The second housing 90 is provided with a charging port 13, and the charging port 13 is located at the side of the second housing 90 far away from the first housing 80. The second housing 90 is made of metal material and therefore has conductive function, and a second conductive part 72 is formed on the outer side of the second housing 90. The second housing 90 and the control circuit board 51 are electrically connected by leads.

Referring to FIG. 1 and FIG. 2, it can be understood that if the Bluetooth accessory is placed with the insulating panel 20 facing upward, the second housing 90 is located at the bottom of the Bluetooth accessory, the first conductive part 71 is located at the bottom of a lower part of the second housing 90, and the second conductive part 72 is located at the side of the second housing 90. Therefore, users may directly contact the positive and negative poles of the external power supply with the bottom of the second housing 90 and the side of the second housing 90 to charge, which is more convenient and direct.

Finally, it should be noted that the above embodiment is only used to illustrate the technical solution of the present application and not to limit it. Although the present application has been described in detail with reference to preferred embodiment, ordinary technical personnel in the art should understand that the technical solution of the present application can be modified or equivalent replaced without departing from the spirit and scope of the technical solution of the present application.

What is claimed is:

1. A Bluetooth accessory, comprising:

a housing provided with an accommodating cavity, and a cavity port is formed on one side of the housing connected to the accommodating cavity;

an insulating panel arranged at the cavity port;

an insulating mounting seat arranged in the accommodating cavity, a first mounting area is arranged on one side of the insulating mounting seat facing the insulating panel, and the first mounting area is arranged at an orthogonal projection position of the insulating mounting seat corresponding to the insulating panel;

a Bluetooth antenna arranged on the insulating mounting seat and located in the first mounting area;

a control module arranged on the insulating mounting seat and electrically connected to the Bluetooth antenna, wherein an accommodating groove is defined in the first mounting area, and the Bluetooth antenna is accommodated in the accommodating groove, wherein a second mounting area is arranged on one side of the insulating mounting seat away from the first mounting area, the control module is arranged in the second mounting arca, further comprising at least one mounting screw, wherein a first connecting hole is defined on the accommodating groove, the Bluetooth antenna is provided with a fixing ring, and the first connecting hole is connected with an inside of the fixing ring; wherein one end of the mounting screw passes through the inside of the fixing ring and the first connecting hole, and is screwed to the control module.

2. The Bluetooth accessory according to claim 1, wherein the first mounting area and the Bluetooth antenna are both arranged in a ring shape along a circumferential direction of the insulating mounting seat.

3. The Bluetooth accessory according to claim 1, wherein a coaming is arranged on one side of the insulating mounting seat far from the first mounting area, the coaming is distributed around a circumference of the insulating mounting seat to define a second mounting area, the control module is limited in the coaming.

4. The Bluetooth accessory according to claim 3, wherein a plurality of buckles are arranged on one side of the coaming far away from the insulating mounting seat, the buckles are spaced apart around the second mounting area, and all buckles are clamped with the control module.

5. The Bluetooth accessory according to claim 4, further comprising fixing screws, wherein the fixing screws and the buckles are spaced apart around the second mounting area, a fixing hole is defined on the insulating mounting seat, and a fixing screw penetrates through the fixing hole and is screwed to the control module.

6. The Bluetooth accessory according to claim 1, further comprising a touch sensing module electrically connected with the control module;

wherein a third mounting area is arranged on one side of the insulating mounting seat facing the insulating panel, the second mounting area is distributed around the third mounting area, and the touch sensing module is arranged in the third mounting area.

7. The Bluetooth accessory according to claim 6, wherein a mounting bump is arranged on one side of the insulating mounting seat facing the insulating panel, a third mounting area is formed by extending one end of the mounting bump towards a direction close to the insulating panel.

8. The Bluetooth accessory according to claim 7, wherein the control module is provided with a connecting terminal, a second connecting hole is defined on the insulating panel, and the second connecting hole penetrates through the mounting bump; one end of the connecting terminal penetrates through the second connecting hole and is connected to the touch sensing module.

9. The Bluetooth accessory according to claim 1, further comprising a charging assembly, the charging assembly is electrically connected to the control module;

wherein the housing is provided with a charging port which penetrates through the housing, and the charging port is arranged corresponding to the charging assembly; wherein the charging assembly is arranged in the accommodating cavity and exposed out of the housing through the charging port.

10. The Bluetooth accessory according to claim 9, wherein the charging assembly comprises a first conductive part and a second conductive part, the first conductive part and the second conductive part are both electrically connected to the control module, the first conductive part is exposed at the charging port, and the second conductive part is arranged outside the housing.

11. The Bluetooth accessory according to claim 10, wherein the first conductive part comprises an insulating mounting plate and an electrode block, the insulating mounting plate is arranged at the charging port, and the electrode block penetrates through the insulating mounting plate and is exposed at the charging port.

12. The Bluetooth accessory according to claim 10, wherein the housing comprises a first housing and a second housing, an insulating panel is arranged on the first housing, and a charging port is arranged on the second housing; the second housing is made of metal material to form a second conductive part on the outer side of the second housing.

13. The Bluetooth accessory according to claim 12, wherein the first housing is detachably connected with the second housing.

* * * * *